Figure 1:
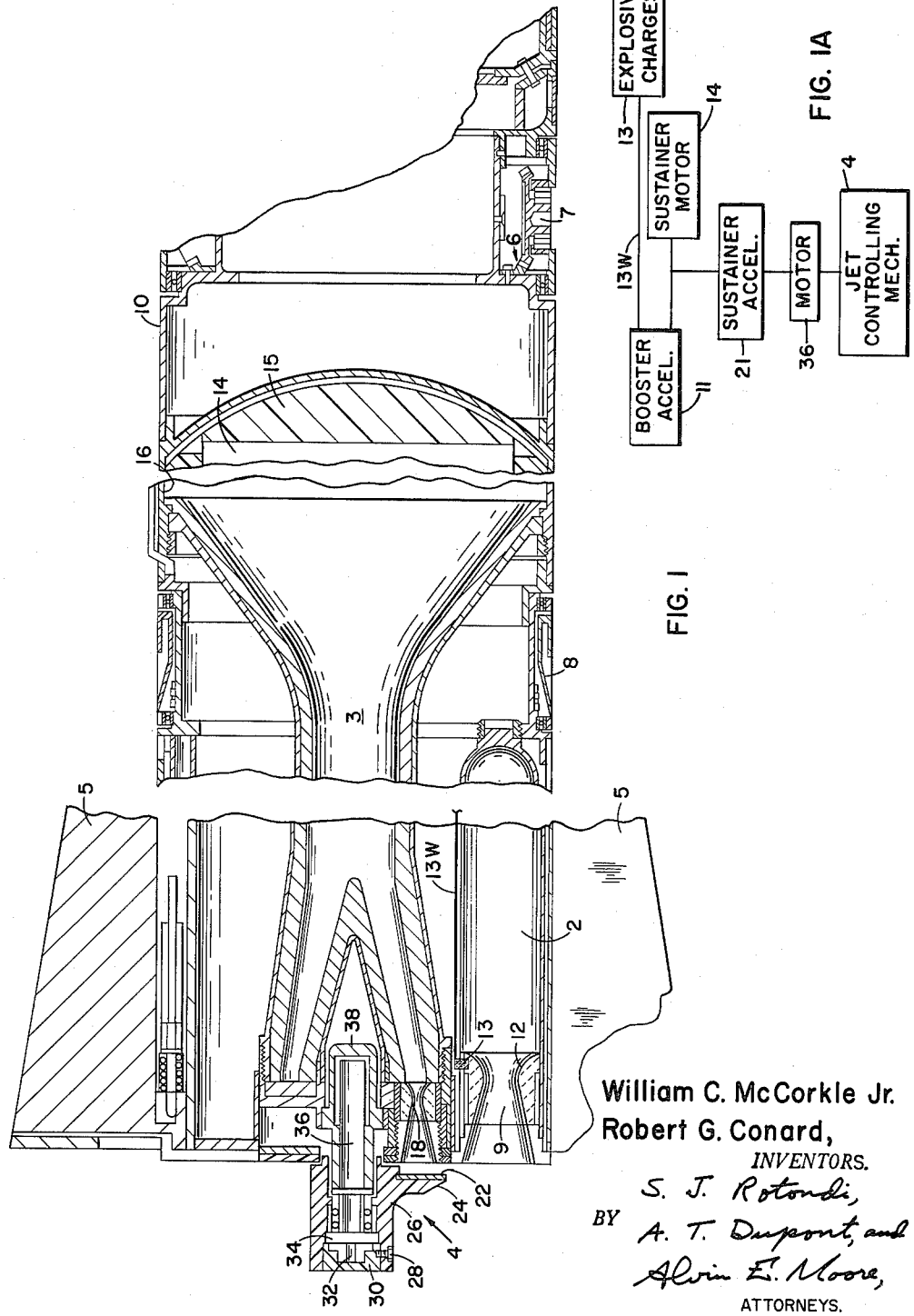

Sept. 14, 1965  W. C. McCORKLE, JR., ETAL  3,205,820
DRAG-COMPENSATED MISSILE
Filed March 8, 1960                                    3 Sheets-Sheet 1

William C. McCorkle Jr.
Robert G. Conard,
         INVENTORS.
BY S. J. Rotondi,
   A. T. Dupont, and
   Alvin E. Moore,
              ATTORNEYS.

Sept. 14, 1965   W. C. McCORKLE, JR., ETAL   3,205,820
DRAG-COMPENSATED MISSILE
Filed March 8, 1960   3 Sheets-Sheet 2

William C. McCorkle Jr.
Robert G. Conard,
  INVENTORS.
BY S. J. Rotondi,
   A. T. Dupont, and
   Alvin E. Moore,
   ATTORNEYS.

Sept. 14, 1965     W. C. McCORKLE, JR., ETAL     3,205,820
DRAG-COMPENSATED MISSILE Filed March 8, 1960                                                                3 Sheets-Sheet 3

William C. McCorkle Jr.
Robert G. Conard,
            INVENTORS.

BY S. J. Rotondi,
    A. T. Dupont, and
    Alvin L. Moore,
              ATTORNEYS.

3,205,820
DRAG-COMPENSATED MISSILE
William C. McCorkle, Jr., and Robert G. Conard, Huntsville, Ala., assignors to the United States of America as represented by the Secretary of the Army
Filed Mar. 8, 1960, Ser. No. 13,665
8 Claims. (Cl. 102—49)
(Granted under Title 35, U.S. Code (1952), sec. 266)

The invention described herein may be manufactured and used by or for the Government for governmental purposes without the payment of any royalty thereon.

This invention relates to a drag-compensated missile. More particularly, the invention comprises a fin-stabilized, air-traversing missile or rocket that automatically aligns its longitudinal axis with the relative wind, and that has means to compensate for thrust and aerodynamic malalignment and for the aerodynamic force of ballistic winds.

In short-range missiles, which have a relatively short booster-burning period, non-gyroscopic rotation sufficiently balances out the effects of thrust and aerodynamic imbalance to limit the vehicle's deviation at booster cutoff to a low figure, so that a sustainer with either variable-position drag brakes on its shell or controllable spoiler vanes in its propulsive jet may be utilized to nullify the effect of the drag in the relative wind, and thus to complete a short range flight with accuracy approaching that of artillery shells. But for obtaining such artillery-like accuracy in atmosphere-traversing missiles or rockets of fairly long range, which has a long booster-burning period and therefore the probability of considerable deviation during this period as well as in the free-flight phase, some other type of means for correcting the vehicle's flight during its booster-propulsion phase is needed. Irrespective of which of these methods of securing accuracy at booster cutoff is utilized, a means for correction of ballistic-wind errors during the post-booster phase of flight is necessary for final accuracy.

Accordingly, it is an object of this invention to provide a fin-stabilized, air-traversing missile that turns into the relative wind compounded of the rocket's motion and natural winds, and that has a very simple guidance and control system to correct for malalignment and ballistic winds.

Another object of the invention is to provide a missile of the above type in which the guidance and control system comprises a velocity-measuring, integrating accelerometer which provides a signal for cutoff of the booster motor and for ignition of the sustainer motor, and which further supplies signals indicating the force and direction of drag, and in which the control system utilizes the last-named signals for control of the missile to compensate for its accuracy-disturbing drag.

A further object of the invention is to provide a missile that is directionally controlled during its booster-propulsion phase and that comprises means for nullifying its drag.

Still another object is to provide a missile which comprises a sustainer and means for nullifying the drag of the vehicle by controlling the thrust of the sustainer.

Figure 2:
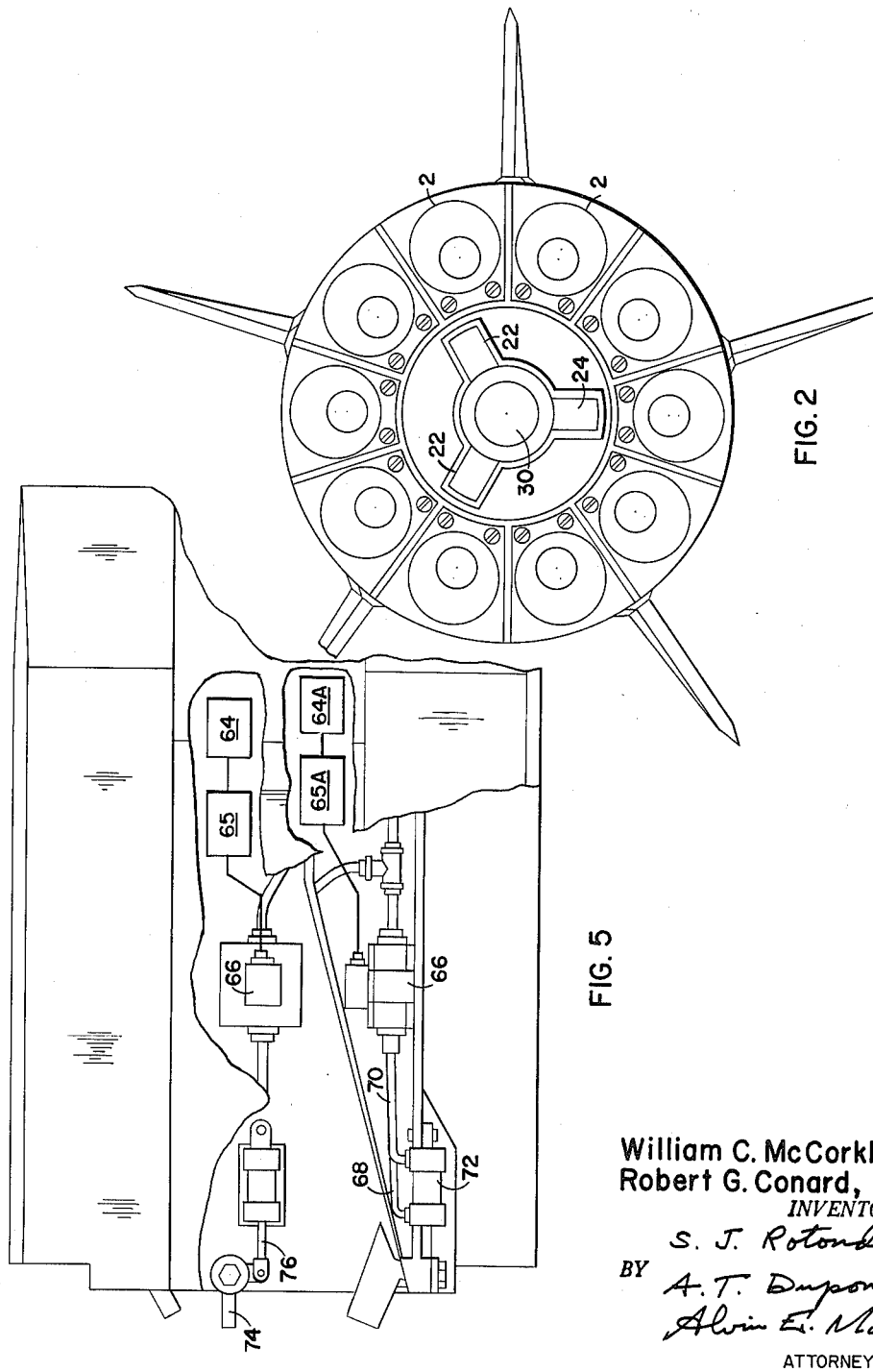
Figure 3:
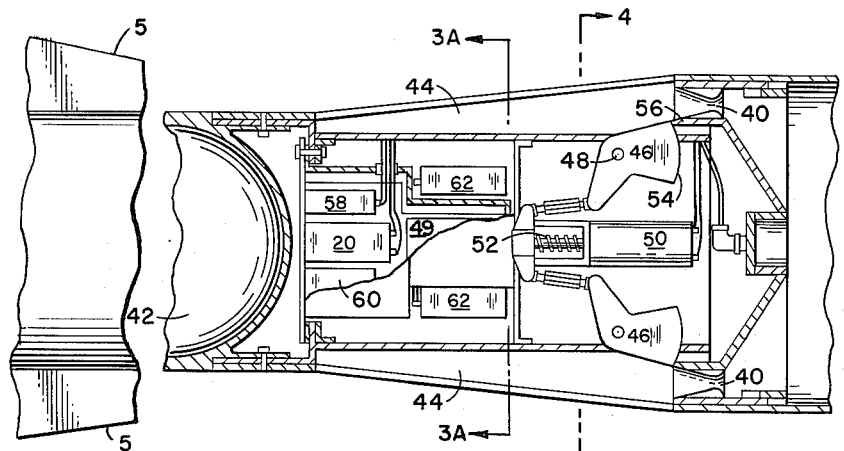
Figure 4:
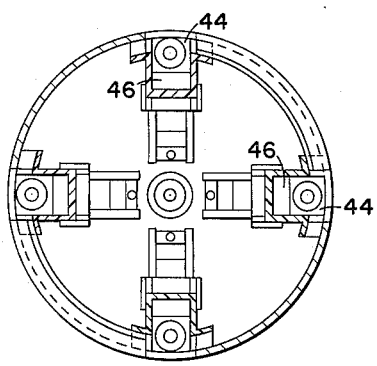
Figure 3A:
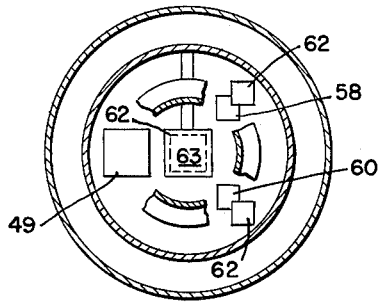

The foregoing and other objects of the invention will become more fully apparent from the following detailed description of exemplary structure embodying the invention and from the accompanying drawings, in which:

FIGURE 1 is an elevational view, partly in section and partly broken away, of one form of the invention.
FIGURE 1A is a block diagram showing the connection between the accelerometers and motors used in FIGURE 1.
FIGURE 2 is an end view of the missile of FIGURE 1.
FIGURE 3 is an elevational view, in section, of another form of the invention, with part of the missile shown as broken away.
FIGURE 3A is a sectional view along the plane of line 3A–3A of FIGURE 3.
FIGURE 4 is a sectional view from the plane 4—4 of FIGURE 3.
FIGURE 5 is a detailed view, partly in section, illustrating another form of the invention that is used where there is only one thrust chamber.

Although a missile that utilizes a rocket motor is shown in these drawings, the invention in its broad aspects may be utilized with any other type of missile propulsion.

In FIGURES 1 and 2 the rocket is shown as comprising booster units 2 that are arranged in a cluster around sustainer outlet tube 3. No control of the booster's thrust is shown, whereas the central, drag-compensating, sustainer motor is provided with mechanism 4 for controlled balancing of the drag.

This form of the invention may be used in a longer-range missile, but is especially adapted for use at the shorter ranges. Imbalance of thrust and of aerodynamic force during the booster-propulsion flight phase is nullified to a certain extent by a means for giving the rocket a spin before launching and by tail fins 5 that are slightly canted relative to a plane thru the missile's longitudinal axis. The spin mechanism comprises gears 6 and a socket 7 (or other separable connection) for a motor. The rocket is mounted for spinning relative to the launcher by means of this socket 7 and another socket, 8, both of which are non-rotatably engaged with the launcher prior to flight of the missile.

Each booster unit preferably comprises solid propellant, which burns to supply propulsive gases to nozzle 9. When the desired velocity has been attained by means of the booster units, an accelerometer 11, of known type, located in portion 10 of the shell sends a signal for cutoff of the booster. This may be achieved by exploding fragmentary explosive charge 13, by means of current thru conductor 13W, and thus disrupting carbon nozzle port 12.

At the same time a signal from the accelerometer fires the centrally located sustainer motor 14, which preferably comprises solid propellant 15 in combustion chamber 16.

During the remaining flight of the rocket its drag is nullified by controlling the outlet of gases from the evenly spaced sustainer nozzles 18. As shown at 21 in FIGURE 1A, a second accelerometer of known type is mounted on the longitudinal axis of the rocket, and preferably at substantially the center of gravity of the missile. This instrument does not require the accuracy of the booster-cutoff accelerometer and may be relatively simply and inexpensive. In lieu of two accelerometers, however, a single instrument may be utilized.

In either event, the second, or sustainer-controlling accelerometer measures accelerations along the longitudinal axis of the missile; and due to the arrow-stabilization of the fins, this axis is substantially coincident with the direction of the relative wind on the rocket's shell. Therefore, after the missile is in free flight, any acceleration along this axis measures a change in the force of the ballistic wind on the rocket.

As this force is nullified, the center of gravity of the rocket proceeds along the desired trajectory, unchanged by the variation in the aerodynamic force. The rocket's attitude may be changed, for it turns to point continually into the relative wind, but its course is unchanged.

This nullification or compensation of the drag is achieved by transmitting a signal from the sustainer-controlling accelerometer to jet-controlling mechanism 4 and by the consequent operation of this mechanism to vary the thrust of the sustainer motor.

Assembly 4 comprises a face plate 22 for each of the sustainer nozzles (three plates being shown in FIGURES 1 and 2). Plate 22 is of a material that is highly resistant to heat, for example of tungsten or molybdenum. Each plate is fixed to a supporting arm 24, which projects from annulus 26. This annulus is fastened by bolt 28, or the like, to disk 30, which is keyed to a driven shaft, 32. The arms and disk are of heat-insulating material, which for example may comprise heat-resistant plastic and asbestos.

Shaft 32 is driven, thru reduction gearing in housing 34, by reversible electric motor 36 which is housed in heat-insulating casing 38.

Operation of the form of FIGURES 1 and 2

At the moment of launching the rocket has a slow, non-gyroscopic spin, due to previous rotation of its gearing 6. During the booster-propulsion phase of the flight this spin is maintained and regularized by the slightly canted tail fins. The fins also arrow-stabilize the missile by causing it to head into the relative wind that is due to the rocket's motion and the ballistic wind. Loss of accuracy due to the ballistic wind during this period is small if the booster burns for only a short time. Optionally, however, a known computer for storing accelerometer signals during this period may be utilized; and at the end of the period it then corrects for booster-propulsion errors.

In any event, when the proper velocity has been attained, a signal comes from the booster-propulsion-phase, integrating accelerometer (and a conventional computer, if one is utilized); and this signal cuts off the booster power, as by exploding nozzle elements 12, and also fires the sustainer motor.

If, as is presently preferable, two accelerometers 11 and 21 are utilized, the second accelerometer then beings to function, to send signals indicating accelerations along the longitudinal axis of the missile, and thus in the direction of the relative wind. After the booster is cut off, changes in the force of this wind on the rocket are caused only by changes in the natural wind's force and density.

If, for example, such a change in drag is due to a cross wind that comes from abaft the beam of the rocket, the missile immediately turns into this wind until the relative wind is along the line of the longitudinal axis and thus becomes a new tail wind that tends to accelerate the rocket out of its planned trajectory. This undesired movement, however, is prevented by a decrease in the thrust of the sustainer or drag-compensating motor.

This decrease of thrust is obtained by rotation of motor 36, which turns plates 22 by an amount that is dependent on the value of the acceleration, causing the plates partially to intercept the three jets from the nozzles, thus spoiling part of the thrust, so that the sustainer again balances the drag. The missile then continues on it predetermined trajectory.

If a cross wind strikes the missile from forward of its beam a reverse operation is achieved, so that the plates are turned partly out of the gaseous streams, until the drag is compensated or balanced out by increased thrust from the drag-compensating sustainer.

In the form of the invention shown in FIGURES 3 and 4, nozzles 40 of the drag-balancing sustainer motor are forward of the booster 42 and supply propulsive gas to the atmosphere thru recesses 44 in the rocket shell. In this form, control of the thrust of the drag-compensating motor is achieved by means of pivoted spoilers 46. These spoilers are shown in FIGURES 3 and 4 as being in their extreme inward position, out of the jet streams from nozzles 40. From this position they may be simultaneously pivoted on pintles 48 by operation of reversible electric motor 50 in response to a signal indicating a change in drag, from a sustainer accelerometer 20 and/or computer 49. Motor 50 turns screw 52, and, by means of a linkage, pivots each spoiler vane until its flat curved portion 54 moves from the position of FIGURE 3 into the gaseous stream from a nozzle 40, thus reducing the thrust from the nozzles, until the decreased drag is balanced. The curve of portion 54 and the curve of the surface of nozzle portion 56 (which portion 54 fits) are centered on the axis of pintle 48.

The static pressure on the flat curved surface of 54 is equal at all points and is directed from each of said points toward the center of curvature. Since the spoilers of each pair are diametrically opposite each other the torque placed on the missile by one of them is counteracted by the torque from the other.

In this form of FIGURES 3 and 4 the simple computer 49 (FIGURE 3A) that is utilized comprises lead, lag and proportional circuits, one of the coils being indicated at 58 and an amplifier shown at 60. The coils and amplifier are arranged in an annulus about accelerometer 20. Batteries 62, also arranged in an annulus, supply current for the circuits.

Because of the lead, lag and proportional circuits the computer sends a signal to motor 50 that is a function of the magnitude of the error involved and that is damped in accordance with the rate of change of the error. The proportional circuit insures that the output signal is proportional to the magnitude of the error. The lead circuit adds to the signal for the purpose of damping the action of servo motor 50. The lag circuit performs a "memory" function in that it integrates the errors of missile drift which remain as a result of the time of servo motor action under the influence of the proportional and lead circuits.

The above-described structure of FIGURES 3 and 4 will function to hold the missile on the trajectory it has at the point of booster burnout or cutoff. For greater accuracy two accelerometers and two servo motors may be used, as illustrated in FIGURE 5, in controlling the direction of the thrust from the booster, until booster burnout and before the sustainer is ignited. However, it is to be understood that any accelerometer 63, of known type, can be used to control booster thrust, in FIGURE 3, as long as it provides substantially the same end result as accelerometer 11 (FIGURE 1A).

The operation of this embodiment is the same as FIGURES 1, 1A and 2.

In FIGURE 5, the inertial guidance system comprises a pair of accelerometers 64 and 64A, of known type, one being sensitive to angular errors about the yaw axis and the other about the pitch axis. The accelerometers send signals to two simple computers 65 and 65A, known in the art, each comprising lead, lag and proportional circuits; and the computers send signals to four electromagnetically controlled valves 66 (only two shown). Each valve controls the supply of fluid in a hydraulic system via lines 68 and 70 to hydraulic servo motor 72 (only two shown). During the booster-propelling phase of the rocket's flight pairs of double-acting motors 72 are separately controlled. Each motor pivots an vane, 74, by means of linkage 76, thus deflecting the booster's thrust. A diametrically arranged pair of motors, simultaneously actuated, control the missile's attitude relative to the yaw axis; and the other pair of diametrically arranged motors control the missile's attitude about the pitch axis. This means for controlling the booster thrust illustrates a type which is designed for use with a missile similar to the one shown in FIGURES 3 and 4. For the purpose of illustration this control means will be coupled with the thrust control means of the sustainer, of FIGURES 3 and 4, for explaining its operation in a missile. It should be understood that the system of FIGURE 5 is useful with a number of missiles of the type shown in FIGURES 3 and 4.

After the booster of FIGURE 5 is cut off and the sustainer is ignited, the jet streams from nozzles 40 (FIGURE 3) are controlled by accelerometer 20, thus compensating for the drag, and maintaining the missile on its correct trajectory, which has been maintained during the booster's thrust by motors 72 and gas-deflecting vanes 74.

In this form of the invention the corrections of the rocket's attitude tend to be adversely influenced by the missile's roll. A desired roll is substantially provided by the angle of canting of the tail fins. However, the speed of this roll is subject to change from the calculated speed due to small errors of manufacture and to changes in the aerodynamic force on the fins caused by changes in the force of the relative wind. Two alternative ways of correcting for these errors in roll speed may be provided. In one, a very fast response of the servo motors is ensured by providing a high gain in the computer proportional circuit coupled with a relatively large power of the servo motors. In the other way, the jet-deflecting vanes of one pair of the vanes are individually actuated, by means of separate signals to the servo motors 72 that control this particular pair of the vanes.

The invention comprehends various obvious changes in structure from that herein illustrated, within the scope of the subjoined claims.

The following invention is claimed:

1. A missile disposed for flight according to a planned trajectory including booster propulsion and sustainer propulsion phases of flight, said missile comprising: a rotary housing assembly; fins fixed to the outside of said assembly, each fin being at a slight angle to a plane thru the longitudinal axis of the housing assembly whereby the missile is arrow-stabilized, is rotated at a non-gyroscopic speed, and the accuracy-disturbing effect of thrust malalignment largely is balanced out; a booster within said housing assembly comprising a booster rocket-motor nozzle for the exit of propulsive gas; a sustainer within said assembly for maintaining the missile on its trajectory after burnout of said booster, comprising a sustainer rocket-motor nozzle; means disposed in said shell for cut-off of said booster motor and ignition of said sustainer motor responsive to said missile attaining a predetermined velocity in the trajectory; accelerometer means, mounted in said assembly substantially on said longitudinal axis, for measuring accelerations and for supplying signals that are measures of said accelerations, said signals comprising an electrical voltage that is proportional to a change in the algebraic sum of the sustainer's thrust and the missile's aerodynamic drag during the post-booster propulsion phase of its flight; means for selectively varying the thrust of the propulsive gas from said sustainer nozzle, said means being disposed for movement into engagement with and for directing of the thrust of the propulsive gas from said sustainer nozzle, without creating aerodynamic braking of said missile; motor means electrically connected to said accelerometer means and drivably connected to said thrust-varying means; whereby a change in said algebraic sum causes said electrical voltage to be supplied to said motor means and said motor means to vary said thrust, until the missile's drag is balanced by said sustainer thrust.

2. A fin-stabilized, atmosphere-traversing missile comprising: a shell; stabilizing fins mounted on the stern of said shell; an accelerometer located substantially at the center of gravity and on the longitudinal axis of the missile, said accelerometer measuring, and transmitting signal voltages representing accelerations along the line of said axis, which is substantially the line of the relative wind on the missile, said signals comprising an electrical voltage that is proportional to a change in the algebraic sum of the sustainer's thrust and missile's aerodynamic drag during the post-booster propulsion phase of its flight; booster propulsive means for placing the missile in the desired speed of flight; a sustainer motor is said shell for maintaining the rocket in its trajectory after said propulsive means ceases its propelling function; means for terminating thrust of said booster propulsive means and for initiating thrust of said sustainer responsive to a predetermined velocity of said missile; means connected to said motor and electrically connected to said accelerometer for varying the propulsive force of said sustainer motor in response to said signal voltages, whereby the propulsive force of said motor is adjusted to compensate for the aerodynamic drag of said missile.

3. A device as set forth in claim 2, in which said sustainer motor is a rocket motor comprising a nozzle for the ejection of propulsive gases, and in which said means for varying propulsive force comprises at least one spoiler movably mounted adjacent to said nozzle and further comprises a servo motor drivably connected to said spoiler, said servo motor being influenced by said signal voltages to move said spoiler relative to the stream of said propulsive gases.

4. A device as set forth in claim 3, in which said means for varying propulsive force comprises a pair of spoilers diametrically located relative to said nozzle.

5. A device as set forth in claim 4, in which said spoilers are pivotally mounted on said shell on axes that are in a plane normal to the rocket's longitudinal axis, each of said spoilers having a flat curved surface that is movable by said servo motor into or away from the stream of said propulsive gases, said curved surface being convex toward said stream and being centered on one of said axes in said plane.

6. A device as set forth in claim 2, in which said sustainer motor is a rocket motor comprising a nozzle for the ejection of propulsion gases, and in which said means for varying propulsive force comprises a plate of heat-resistant material rotatably mounted on the rocket's longitudinal axis, adjacent to said nozzle, and further comprises a servo motor drivably connected to said plate, said servo motor being influenced by said signal voltages to rotate said plate into or away from said stream of propulsive gases.

7. A device as set forth in claim 6, in which said sustainer motor nozzle comprises a plurality of outlets, and in which said plate comprises a plurality of arms disposed for engagement with said outlets upon rotation of said plate by said servo motor.

8. A missile disposed for flight according to a planned trajectory including booster propulsion and sustainer propulsion phases of flight; said missile provided with booster and sustainer propulsion units; a rotary housing assembly enclosing said propulsion units; fins fixed to the outside of said assembly, each fin being at a slight angle to a plane thru the longitudinal axis of the assembly to maintain the spin stabilization of the missile in the booster-propulsion phase of flight; means disposed in said shell for terminating the thrust of said booster motor when said missile attains a predetermined velocity in the trajectory and for ignition of said sustainer unit; accelerometer means, mounted in said assembly substantially on said longitudinal axis, said accelerometer disposed to generate an electric signal proportionate to the differential in drag of the missile and sustainer thrust during the sustainer phase of flight; means for receiving said signals and for selectively varying the thrust of said sustainer to change the velocity of the missile responsive to said signals.

References Cited by the Examiner

UNITED STATES PATENTS

| | | | |
|---|---|---|---|
| 1,879,187 | 9/32 | Goddard | 102—49 X |
| 2,396,321 | 3/46 | Goddard | 244—76 |
| 2,692,475 | 10/54 | Hull | 102—49 |
| 2,724,237 | 11/55 | Hickman | 60—35.6 |
| 2,766,581 | 10/56 | Welsch | 102—49 |
| 2,869,804 | 1/59 | Munich et al. | 102—50 X |
| 2,870,711 | 1/59 | Barr et al. | 102—50 |
| 2,928,346 | 3/60 | Grimes | 102—49 |
| 2,944,390 | 7/60 | Kethley et al. | 102—49 X |
| 2,968,996 | 1/61 | Strickland et al. | 102—50 X |
| 2,969,017 | 1/61 | Kershner | 102—50 |
| 3,073,550 | 1/63 | Young | 244—14 |

BENJAMIN A. BORCHELT, *Primary Examiner.*

SAMUEL BOYD, SAMUEL FEINBERG, *Examiners.*